United States Patent Office 2,983,066
Patented May 9, 1961

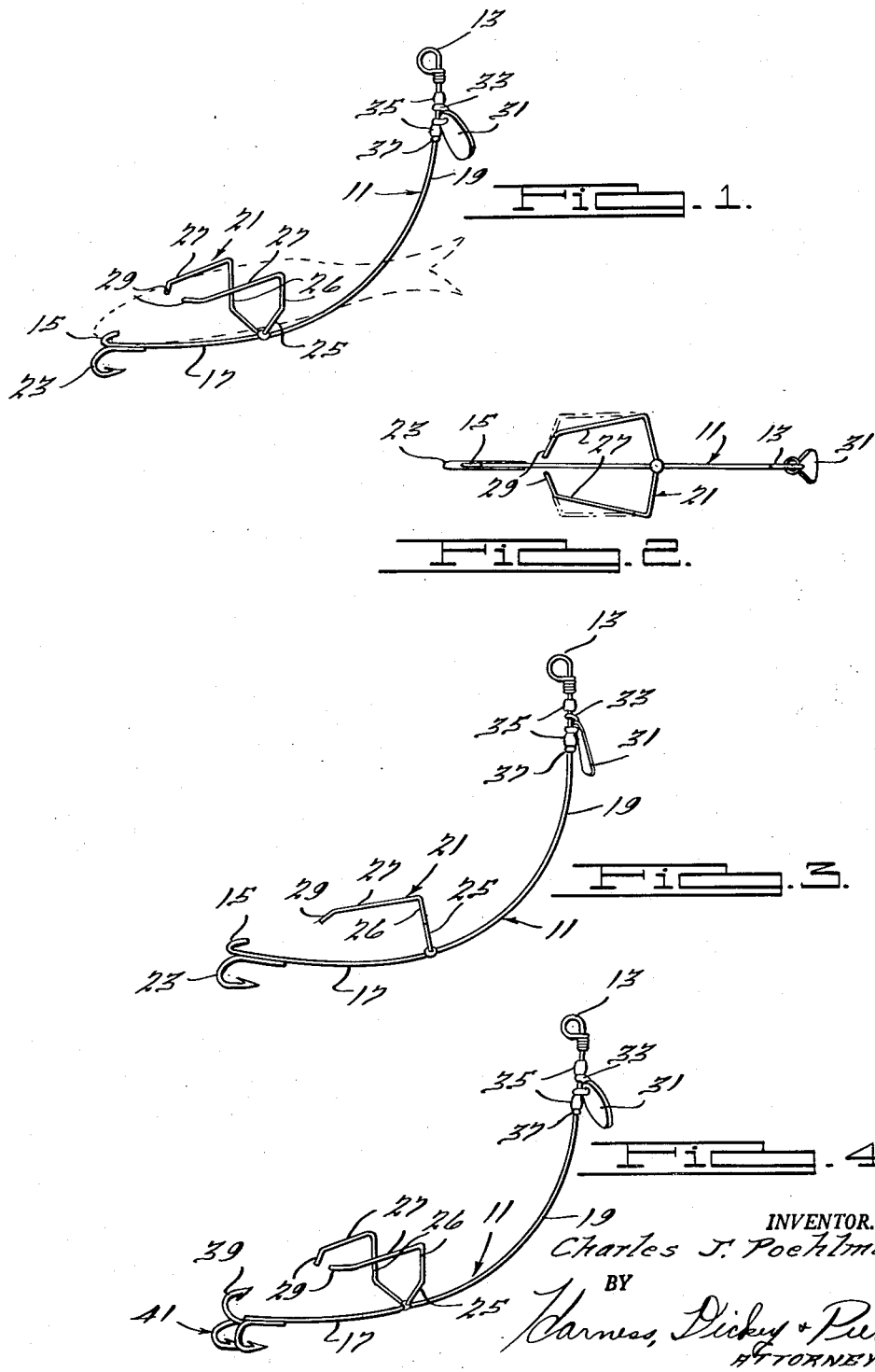

2,983,066
LIVE BAIT RETAINER AND FISH HOOK
Charles J. Poehlman, 209 S. Edgeworth, Royal Oak, Mich.
Filed Dec. 11, 1958, Ser. No. 779,770
6 Claims. (Cl. 43—44.6)

This invention relates to fish hooks and particularly to a fish hook having special means for holding a minnow or other bait in a live condition.

It is an object of the present invention to provide a fish hook, by means of which a minnow or other bait may be held in proximity to the hook for long periods of time without the necessity of inserting the hook through the body or mouth of the fish and without inflicting any body damage to the bait which might kill the bait within a short period of time.

It is a further object of the present invention to provide a fish hook of the above character, by means of which the bait is both able to move a limited amount in order to attract game fish and is, in fact, excited into movement by the manner in which it is held.

It is another object of the present invention to provide a fish hook of the above character in which the minnow or other live bait may be rapidly secured in place and which avoids time consuming or tedious adjustments or fastenings.

It is still another object of the present invention to provide a fish hook of the above character which may be made primarily from thin wires so as to be substantially invisible to the game fish, thereby avoiding the bulk of previous bait retainers which impairs the natural appearance of the bait.

It is still another object of the present invention to provide a fish hook and retainer of the above character which is simple in construction, inexpensive to manufacture, and sturdy in construction.

These and other objects of the present invention will become apparent from the following detailed description taken in conjunction with the accompanying drawing, in which:

Figure 1 is a perspective view of the fish hook and retainer embodying the principles of the present invention;

Fig. 2 is a plan view of the structure illustrated in Fig. 1;

Fig. 3 is a side elevational view of the structure illustrated in Fig. 1; and

Fig. 4 is a perspective view of another form of the present invention.

Referring now to the drawings and more particularly to Fig. 1, it will be seen that the device of the present invention includes a main elongated body wire 11 having its upper end bent to form an eyelet 13 and having its lower end reversely bent to form a stop or hook 15. The wire 11 is arcuately bent over the major portion of its length through an angle of substantially ninety degrees so that the lower portion 17 of the wire normally is held in a horizontal position while the upper end 19 of the wire will be disposed in a substantially vertical position in alignment with the fishing line (not shown) which is connected to the device at the eyelet 13.

A spring wire clamp, generally indicated at 21, is secured to the body wire 11 in a position spaced from the stop 15 and is adapted to clamp a bait on the opposite sides thereof with the stop 15 engaged in the mouth of the bait. Inasmuch as a perch or other game fish normally attacks the head of a minnow or other live bait, a barbed fish hook 23 is affixed to the body wire 11 immediately beneath the stop 15, so as to be close to the head of the bait.

The clamp 21 is composed of a yoke or generally U-shaped supporting portion 25 having laterally spaced leg sections 26 extending upwardly on opposite sides thereof. The leg sections 26 are joined at their upper ends with a pair of resilient arm portions 27 extending generally longitudinally rearwardly toward the stop 15. The arms 27 are normally disposed in a converging relationship, although they are adapted to be spread into substantially parallel relationship upon the insertion of the bait. The terminal portions of the arms 27 are bent inwardly and downwardly to form prongs 29, the ends of which are adapted to bear with pressure against the opposite sides of the bait.

While the device of the present invention can be used with a variety of live bait, such as lizards, frogs, crayfish and the like, Figure 1 illustrates its use with a minnow, inasmuch as this is the most commonly used bait for which the device is intended. To secure the minnow in place, it is projected head first through the yoke 25 from the forward side thereof and moved toward the closely spaced prongs 29. As will be noted in Fig. 2, the prongs 29 are inclined away from the minnow upon this approach, and therefore when the head of the minnow engages the prongs 29 it will spread the arms 27 apart by a cam action. Upon continued rearward movement of the minnow the free ends of the prongs 29 bear against the opposite sides of the minnow and slide along the minnow until the head of the minnow engages the stop 15. It will be noted that the stop 15 is so shaped as to conveniently extend over the lower lip of the minnow and into its mouth. Further rearward movement of the minnor is thus prevented by the stop 15.

Lateral movement of the forward part of the minnow is restrained by the prongs 29 which are inwardly biased against the sides of the minnow. This bias or pressure is supplied not only by slight flexure of the arms 27, but also by torsional loading of the leg sections 26. By virtue of the fact that the prongs 29 are angularly inclined in a rearward direction, they function to prevent escape of the minnow by movement away from the stop 15. Attempted backward movement of the minnow (forwardly relative to the device) will cause the prongs 29 to bear more tightly against the sides of the minnow and restrain the minnow against further movement in that direction. It will also be noted that lateral movement of the mid-portion of the minnow is limited by both the arms 27 and the leg sections 26, thereby preventing the minnow from twisting out from between the prongs. In addition, downward movement of the minnow is restrained by the lower portion 17 of the body wire 11. The force of the clamping action of the prongs 29 is sufficient to prevent escape of the minnow by upward movement. This is also aided somewhat by the slight downward bend of the prongs 29. However, it should be noted that the ability of a minnow to swim directly up or down in a direction ninety degrees to its body length is negligible, the most important movements to restrain being on a horizontal plane.

It has been discovered that minnows are quite sensitive in the area behind their gills and that the ends of the prongs 29 bearing against the sides of the minnow in that location excite it into pronounced movement. Thus, a minnow held in the device of the present invention will wiggle within the limits of its bond and this motion is an important factor in attracting fish. Thus, even in still fishing a certain amount of live action is obtained by the use of the device of the present invention. It should also be noted that while the device holds the bait so that it faces backwards, it has been found that successful trolling may be achieved with the bait in this condition.

As may be seen from the drawings, the structure of the present invention permits the convenient attachment of additional lures, such as a brightly colored spoon 31 secured on the wire 11 by a clamp 33 and positioned between colored glass beads 35. The beads 35 are disposed between the eyelet 13 and a drop of solder 37 adhered to the wire 11.

Figure 4 illustrates a form of the invention which is slightly modified in that the stop or hook 15 has substituted therefor the uppermost hook 39 of a three-pronged fish hook, which is generally indicated at 41. This modification is more particularly suited for use with frogs or other larger mouthed types of bait.

While the device of the present invention may be made from a variety of materials, the use of stainless steel spring wire, such as piano wire, for the clamp 21 and body wire 11 has been found to achieve excellent results. It notably affords the desired resiliency for the clamp 21, but when used for the body wire 11 it will straighten out under the pull of a hooked fish without breaking. The hook 23 and the clamping wire 25 may be secured to the body wire 11 by soldering, brazing, spot welding or any other suitable bonding method. In soldering it has been found that if a flux of high silver content and low lead content is used, a strong, completely adequate bond may be obtained. It will be noted that the wires 25 and 11 are relatively thin and therefore present a minimum of bulk to obscure the natural appearance of the minnow or other live bait. In addition, the use of wires which are bent to the appropriate shape provides a structure which is inexpensive to manufacture, yet is ideally suited for the intended function.

It will be appreciated that the present invention is susceptible of certain changes or modifications within the scope of the present invention. For example, the body wire 11 may be made from the shank of the fish hook 23, which is suitably elongated for this purpose, with a separate stop being bonded thereto. Also, the clamp 21 may be made from separate pieces of material rather than one length of wire bent to the appropriate shape. It will be appreciated that these and other modifications of the present invention may be made without departing from the fair scope or intended meaning of the subjoined claims.

What is claimed is:

1. A fish hook structure including an elongated body element provided with means for connection to a line and having a stop portion formed at one end thereof, a fish hook connected to said body element, and a clamp member fixedly secured to said body element, said clamp member having a yoke portion disposed generally perpendicularly to said body element and through which a bait is adapted to extend, and opposed prong portions carried by said yoke portion so as to be biased against opposite sides of the bait, said prong portions being angularly disposed to permit movement of the bait therebetween toward said stop and resist movement of the bait in the opposite direction away from said stop.

2. A live bait retainer and fish hook structure including a main body wire having an arcuate bend defining an upper portion and a lower portion disposed at substantially right angles to one another, the upper terminus of said body wire having an eyelet and the lower terminus of said body wire having a stop portion, a clamp wire secured to said body wire in a position spaced from said stop, said clamp wire having a pair of inwardly turned prong portions adapted to bear against opposite sides of a bait and hold the bait therebetween with said stop portion disposed in the mouth of the bait, and a fish hook secured to said body wire.

3. A fish hook structure including an elongated body element provided with means for connection to a line, a fish hook connected to said body element, and a clamping wire secured to said body element, said clamping wire having a bend defining a pair of generally upright supporting sections adapted to lie on opposite sides of a bait, a pair of elongated arm portions joined to the upper ends of said supporting sections and adapted to extend generally longitudinally along the opposite sides of the bait, and a pair of prongs defined by the free ends of said arms being inwardly bent.

4. A live bait retainer and fish hook structure including an elongated body element provided with means for connection to a line and having a stop portion formed thereon, a fish hook connected to said body element, and a clamping member secured to said body element, said clamping member having a generally U-shaped supporting portion, a pair of elongated arm portions on opposite sides of said supporting portion adapted to extend along opposite sides of a bait, and a pair of prongs carried one by each of said arm portions and being adapted to extend inwardly against the side of a bait, said prongs being convergingly inclined toward said stop, whereby said arms will spread apart upon movement of a bait therebetween in the direction of said stop and resist movement of the bait in the opposite direction away from said stop.

5. A live bait retainer and fish hook including an elongated main body element of spring wire arcuately bent to provide an upper portion and a lower portion disposed at substantially right angles to one another, a stop formed on the lower portion of said body wire, a fish hook secured to the lower portion of said body wire, and a clamp member secured to the lower portion of said body wire in a position spaced from said stop, said clamp having a pair of laterally spaced supporting sections adapted to lie on opposite sides of a bait and carrying a pair of inwardly directed prongs adapted to bear against opposite sides of a bait to retain a bait therebetween and in engagement with said stop, the upper portion of said body wire having means for connection to a line at the upper terminus thereof whereby said upper portion will be maintained in a vertical position and said lower portion in a horizontal position during use.

6. A live minnow retainer and fish hook including a main body wire having at one end means for connection to a line and having a stop at the other end thereof adapted to project into the mouth of a minnow, a fish hook secured to said body wire adjacent said stop, and a clamping wire secured to said body wire in a position spaced from said stop, said body wire having a yoke portion through which the body of a minnow is adapted to extend, a pair of arms extending from said yoke portion convergingly in the direction of said stop and having their free ends inwardly bent to form prongs adapted to engage the opposite sides of the minnow, whereby outward spreading of said arms upon the insertion of a minnow between said prongs will cause torsional loading of said yoke portion to supply an inwardly directed pressure to said prongs sufficient to retain a minnow therebetween with the mouth of the minnow in engagement with said stop.

References Cited in the file of this patent

UNITED STATES PATENTS

| | | |
|---|---|---|
| 699,304 | Gebhardt | May 6, 1902 |
| 991,745 | Randal | May 9, 1911 |
| 2,319,246 | Martin | May 18, 1943 |